United States Patent
Tong et al.

(10) Patent No.: US 9,674,877 B2
(45) Date of Patent: Jun. 6, 2017

(54) MOBILE COMMUNICATION SYSTEM, USER TERMINAL, PROCESSOR, AND BASE STATION

(71) Applicant: KYOCERA CORPORATION, Kyoto (JP)

(72) Inventors: Fangwei Tong, Machida (JP); Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/431,706

(22) PCT Filed: Sep. 27, 2013

(86) PCT No.: PCT/JP2013/076433
§ 371 (c)(1),
(2) Date: Mar. 26, 2015

(87) PCT Pub. No.: WO2014/051126
PCT Pub. Date: Apr. 3, 2014

(65) Prior Publication Data
US 2015/0271856 A1   Sep. 24, 2015

Related U.S. Application Data

(60) Provisional application No. 61/706,365, filed on Sep. 27, 2012.

(51) Int. Cl.
*H04W 4/00* (2009.01)
*H04W 76/02* (2009.01)
(Continued)

(52) U.S. Cl.
CPC ........... *H04W 76/02* (2013.01); *H04W 8/005* (2013.01); *H04W 16/26* (2013.01);
(Continued)

(58) Field of Classification Search
None
See application file for complete search history.

(56) References Cited

U.S. PATENT DOCUMENTS 7,139,589 B2   11/2006   Sawada
2005/0148315 A1   7/2005   Sawada
(Continued)

FOREIGN PATENT DOCUMENTS

JP   2002-186028 A   6/2002
JP   2003-318799 A   11/2003
(Continued)

OTHER PUBLICATIONS

The extended European search report issued by the European Patent Office on Apr. 26, 2016, which corresponds to European Patent Application No. 13841574.0-1854 and is related to U.S. Appl. No. 14/431,706.

(Continued)

*Primary Examiner* — Erika Washington
(74) *Attorney, Agent, or Firm* — Studebaker & Brackett PC

(57) ABSTRACT

A mobile communication system, which supports D2D communication that is direct device to device communication, comprises: a user terminal that transmits a discovery signal that is used for discovering a communication partner terminal in the D2D communication, wherein the user terminal transmits the discovery signal when the user terminal accepts start of communication and the user terminal has difficulty to establish a connection with a base station.

9 Claims, 11 Drawing Sheets

(51) Int. Cl.
  *H04W 16/26* (2009.01)
  *H04W 8/00* (2009.01)
  *H04W 72/04* (2009.01)
  *H04W 88/04* (2009.01)
  *H04W 48/16* (2009.01)

(52) U.S. Cl.
  CPC .......... *H04W 72/048* (2013.01); *H04W 48/16* (2013.01); *H04W 88/04* (2013.01)

(56) References Cited

U.S. PATENT DOCUMENTS

| 2007/0049270 | A1 | 3/2007 | Sawada | |
|---|---|---|---|---|
| 2007/0123245 | A1 | 5/2007 | Hu | |
| 2010/0167743 | A1 | 7/2010 | Palanki et al. | |
| 2011/0208842 | A1* | 8/2011 | Mildh | H04B 7/155 709/220 |
| 2012/0127888 | A1* | 5/2012 | Fujishima | H04W 72/085 370/252 |
| 2013/0016649 | A1* | 1/2013 | Damnjanovic | H04W 88/04 370/315 |
| 2014/0086141 | A1* | 3/2014 | Morioka | H04W 40/08 370/315 |

FOREIGN PATENT DOCUMENTS

| JP | 2007-151006 A | 6/2007 |
|---|---|---|
| WO | 2004/068742 A1 | 8/2004 |
| WO | 2006/134562 A2 | 12/2006 |
| WO | 2011/103719 A1 | 9/2011 |

OTHER PUBLICATIONS

Alcatel-Lucent et al.; "FS_ProSe: ProSe Control Paths"; 3GPP TSG-SA WG1 #59; S1-122416; Jul. 30-Aug. 3, 2012; pp. 1-6 ; Chicago, IL, USA.

ITRI; "Relay for Public Safety ProSe"; SA WG2 Meeting S2#99; S2-133501; Sep. 23-27, 2013; pp. 1-4; Kiamen, China.

Renesas Mobile Europe Ltd.; "Connection setup via ProSe UE-to-UE Relay"; SA WG2 Meeting #97; S2-131972; May 27-31, 2013, pp. 1-3; Busan, South Korea.

Renesas Mobile Europe Ltd.; "Connection setup via ProSe UE-to-Network Relay"; SA WG2 Meeting #97; S2-131971; May 27-31, 2013, pp. 1-4; Busan, South Korea.

Kyocera; "Cosideration of initiation of ProSe UE-to-Network Relays"; 3GPP TSG-RAN WG2 #91; R2-153351; Aug. 24-28, 2015, pp. 1-7; Beijing, China.

International Search Report; PCT/JP2013/076433; Jan. 7, 2014.

3GPP TR 22.803 V0.3.0 (May 2012); 3rd Generation Partnership Project; Technical Specification Group SA; Feasibility Study for Proximity Services (ProSe) (Release 12); pp. 1-24.

JP Office Action dated Dec. 20, 2016 from corresponding JP Appl No. 2016-077587, with concise statement of relevance, 5 pp.

\* cited by examiner

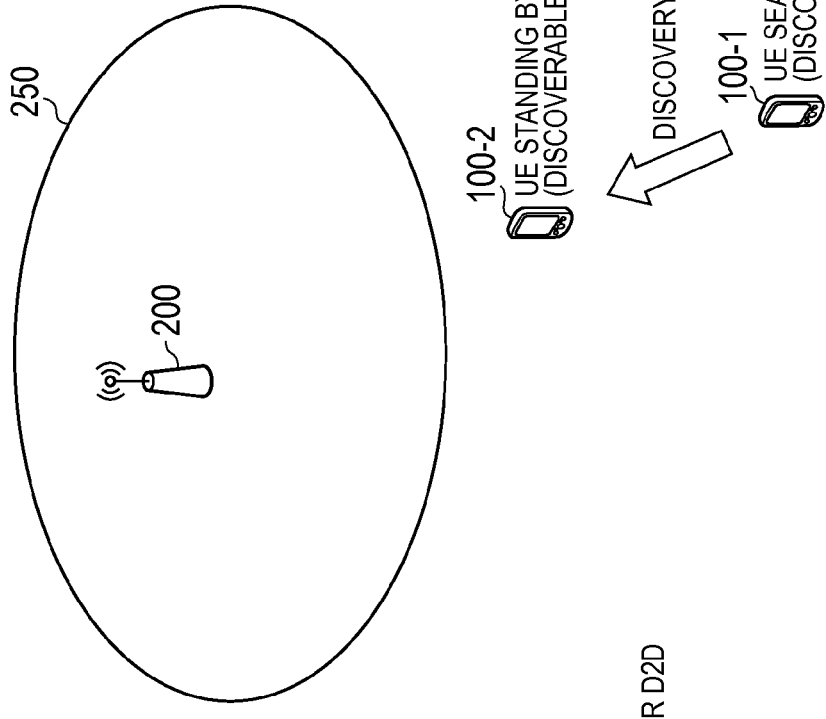
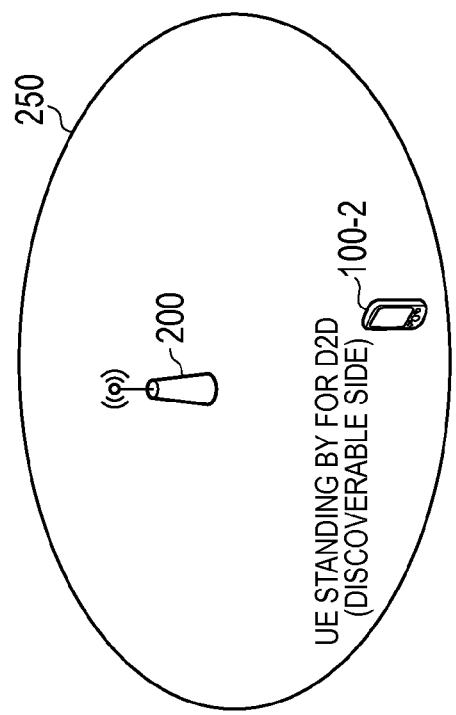

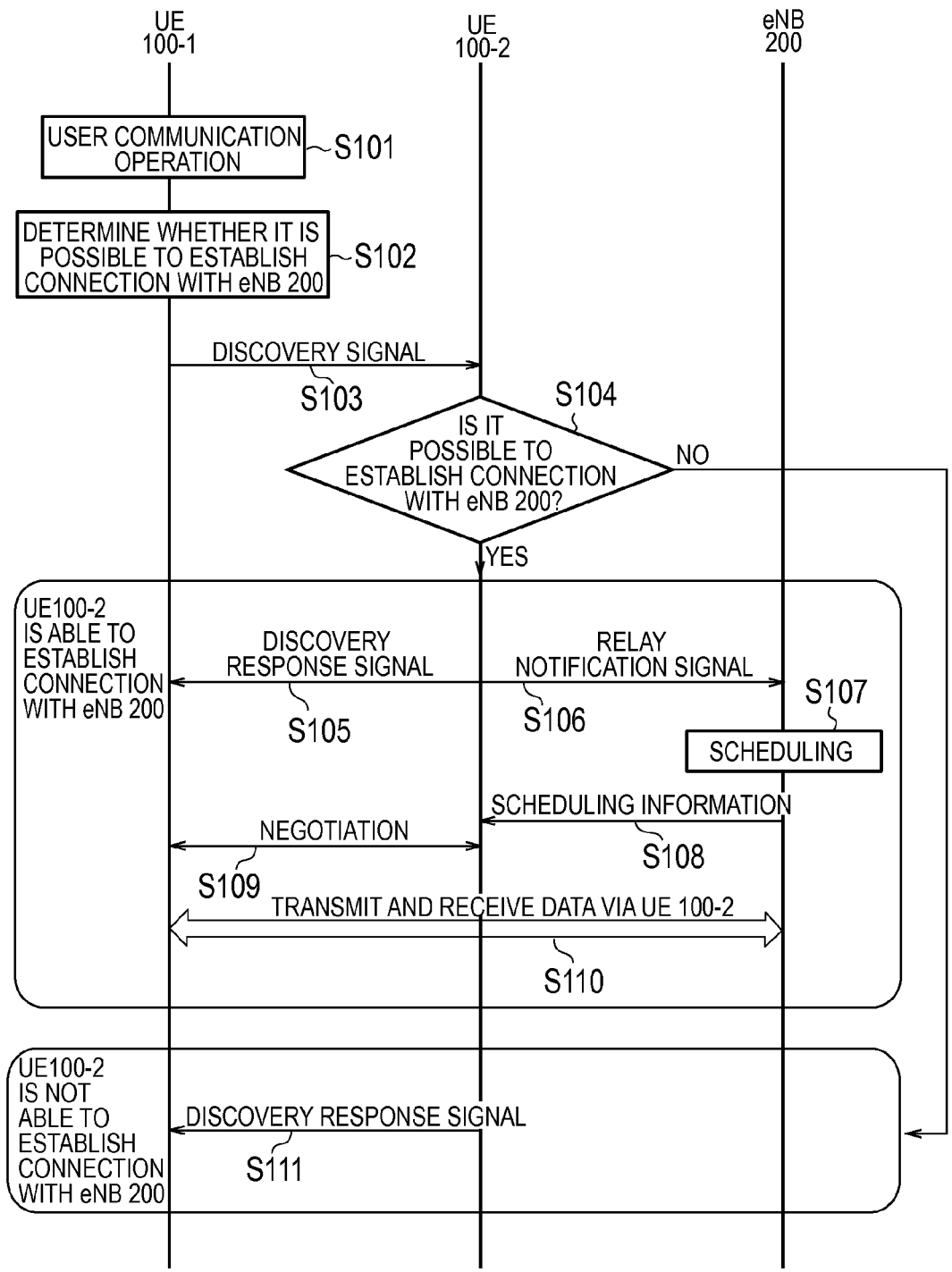

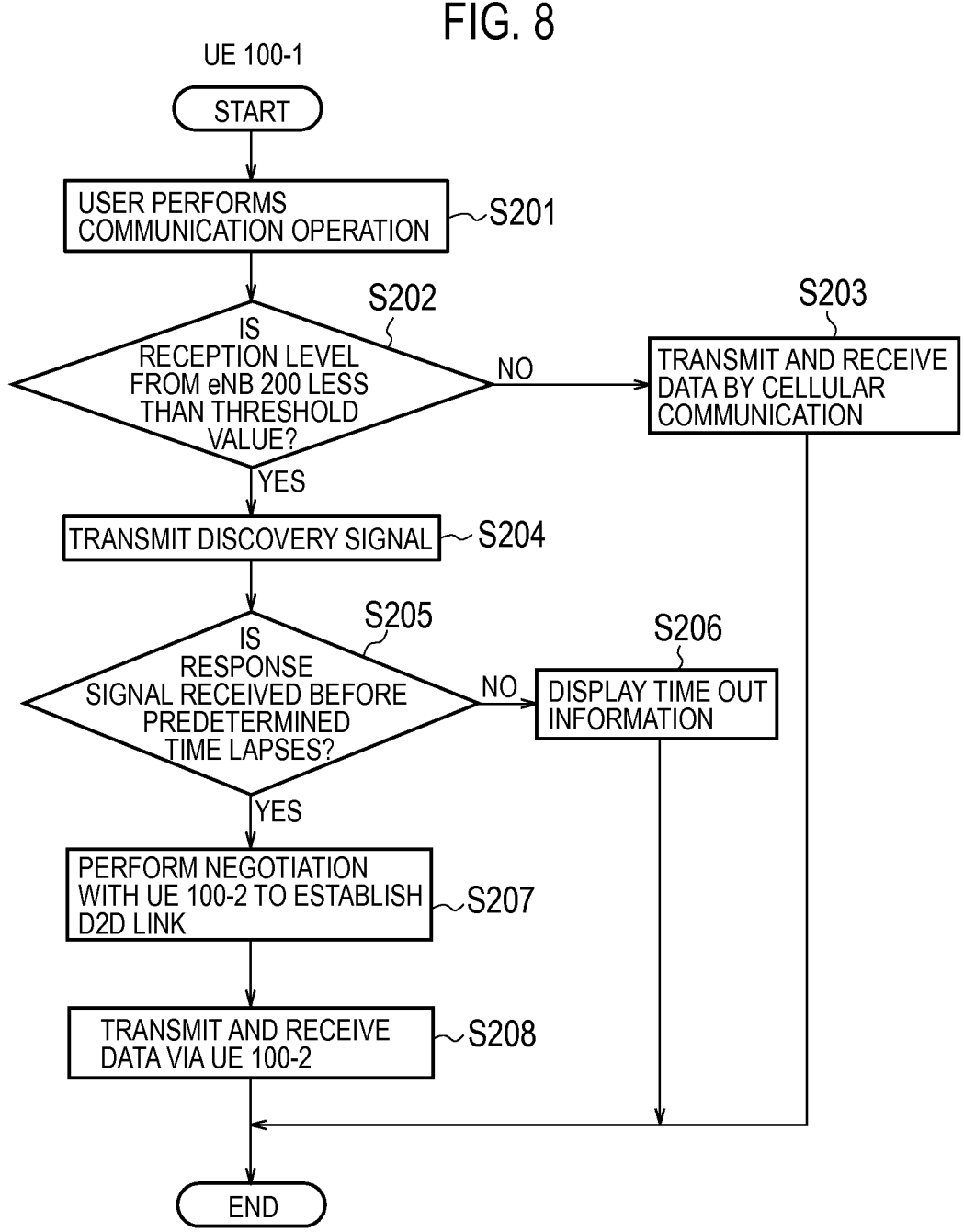

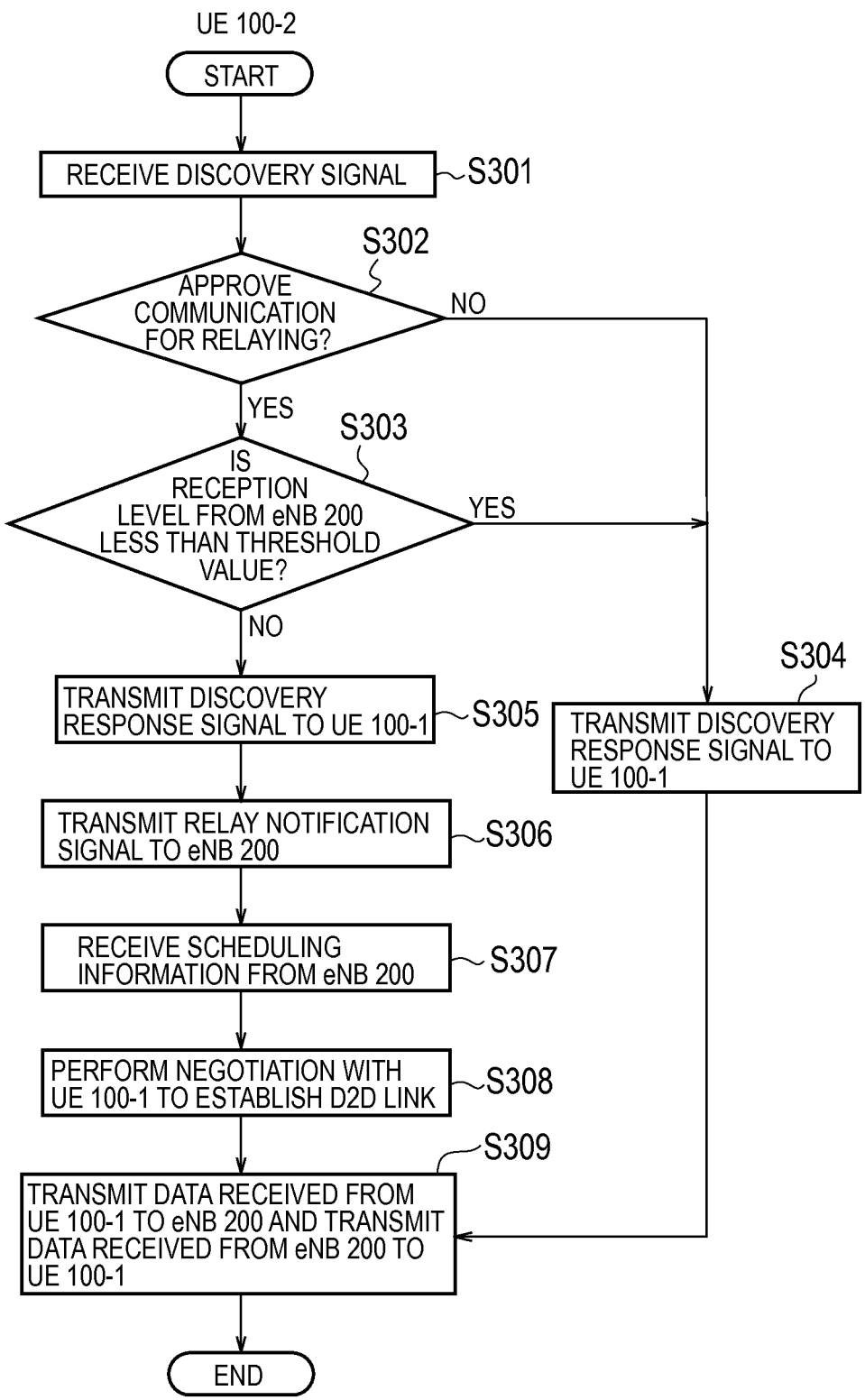

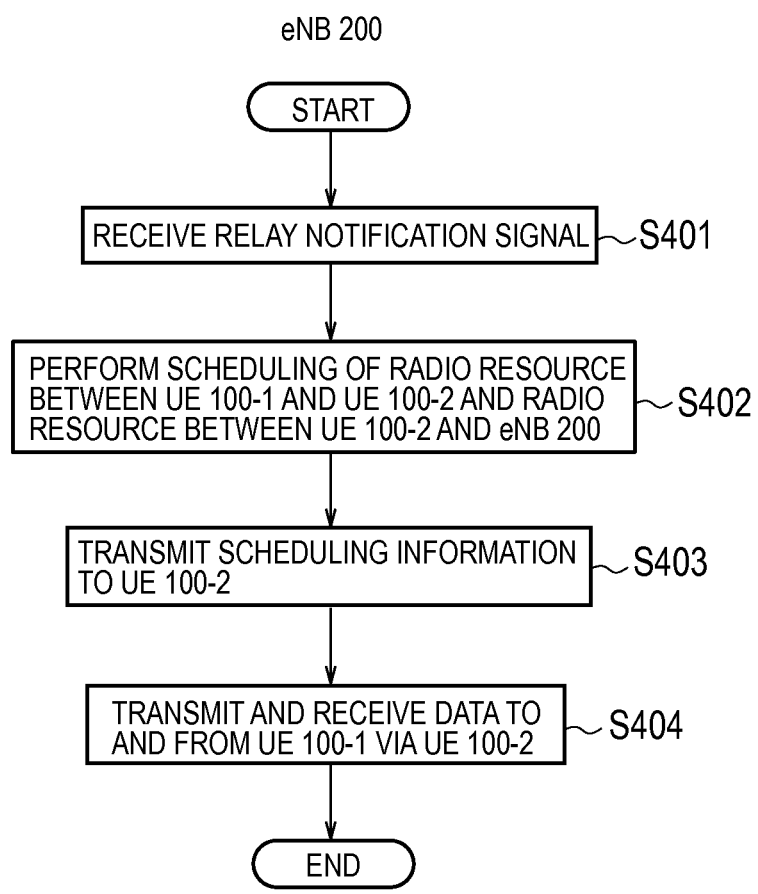

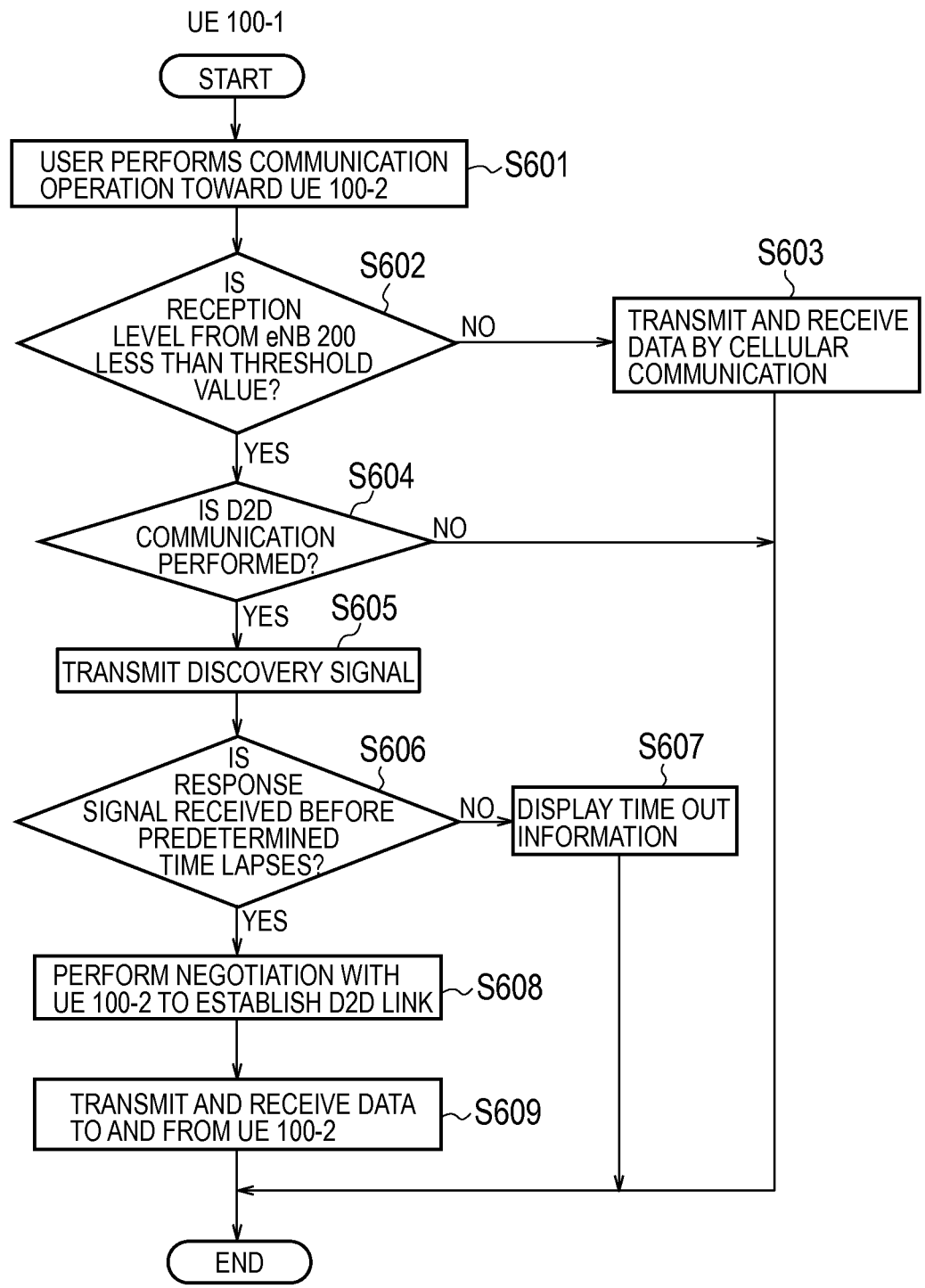

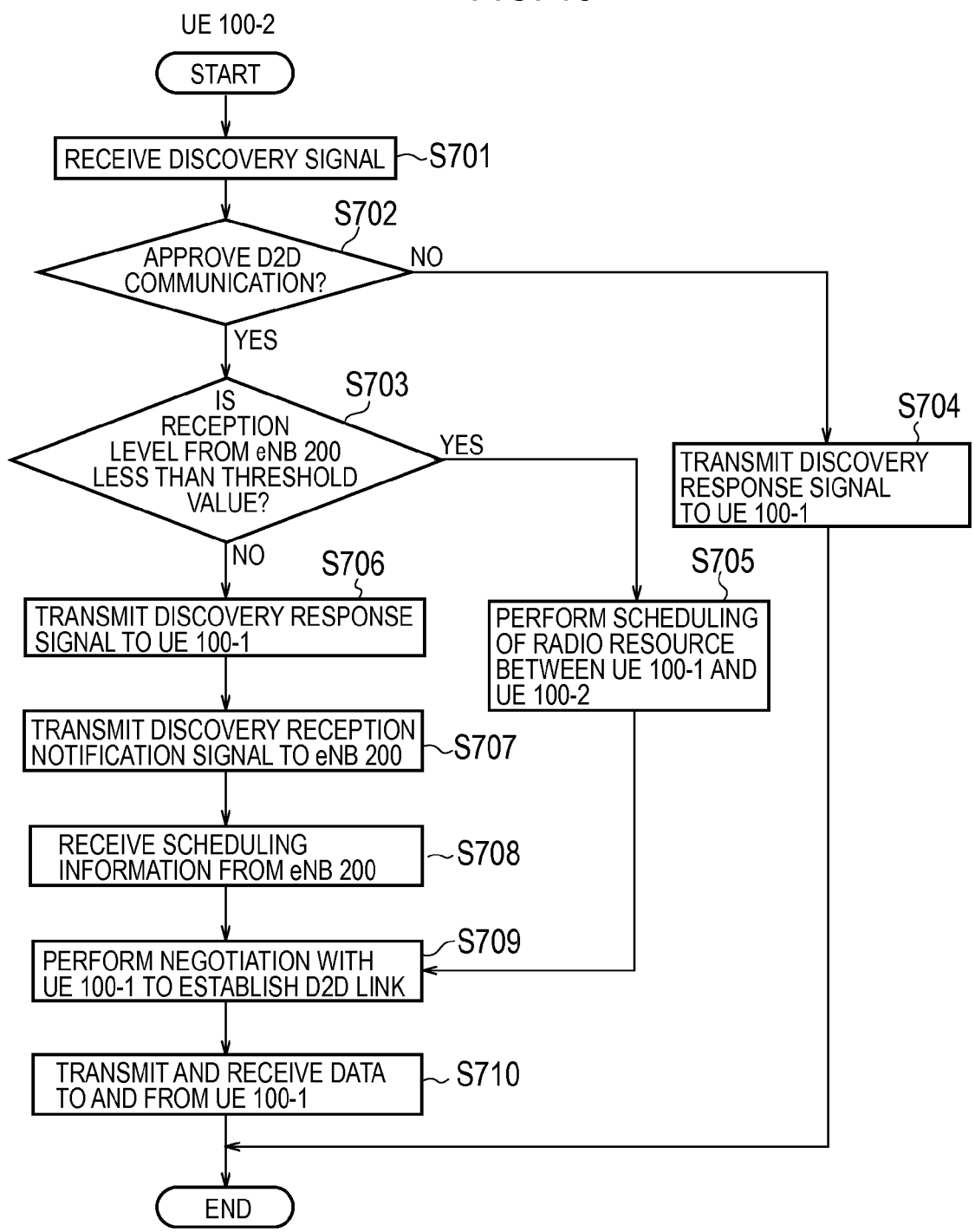

MOBILE COMMUNICATION SYSTEM, USER TERMINAL, PROCESSOR, AND BASE STATION

TECHNICAL FIELD

The present invention relates to a mobile communication system that supports D2D communication, a user terminal, a processor and a base station.

BACKGROUND ART

In 3GPP (3rd Generation Partnership Project) which is a project aiming to standardize a mobile communication system, the introduction of Device to Device (D2D) communication is discussed as a new function after Release 12 (see non patent document).

In the D2D communication, a plurality of adjacent user terminals perform direct radio communication in a frequency band assigned to a mobile communication system. It is noted that the D2D communication is also called proximity service (Proximity Service) communication.

PRIOR ART DOCUMENT

Non-Patent Document

Non Patent Document 1: 3GPP technical report "TR 22.803 V0.3.0" May 2012

SUMMARY OF THE INVENTION

In the current specifications, since there is no scheme for appropriately controlling the D2D communication, there is a problem that it is not possible to effectively utilize the D2D communication.

Therefore, the present invention provides a mobile communication system, a user terminal, a processor, and a base station, by which it is possible to effectively utilize D2D communication.

A mobile communication system according to embodiment, which supports D2D communication that is direct device to device communication, comprises a user terminal that transmits a discovery signal that is used for discovering a communication partner terminal in the D2D communication. The user terminal transmits the discovery signal when the user terminal accepts start of communication and the user terminal has difficulty to establish a connection with a base station.

BRIEF DESCRIPTION OF THE DRAWINGS

FIG. 6A and FIG. 6B are diagrams illustrating a positional relation between UE 100 and eNB 200.
FIG. 7 is an example of a sequence diagram of an entire operation according to a first embodiment.
FIG. 8 is a flowchart illustrating an operation of UE 100-1 according to the first embodiment.
FIG. 9 is a flowchart illustrating an operation of UE 100-2 according to the first embodiment.

FIG. 10 is a flowchart illustrating an operation of the eNB 200 according to the first embodiment.
FIG. 12 is a flowchart illustrating an operation of the UE 100-1 according to the second embodiment.
FIG. 13 is a flowchart illustrating an operation of the UE 100-2 according to the second embodiment.

DESCRIPTION OF THE EMBODIMENT

[Overview of Embodiment]

Figure 1:
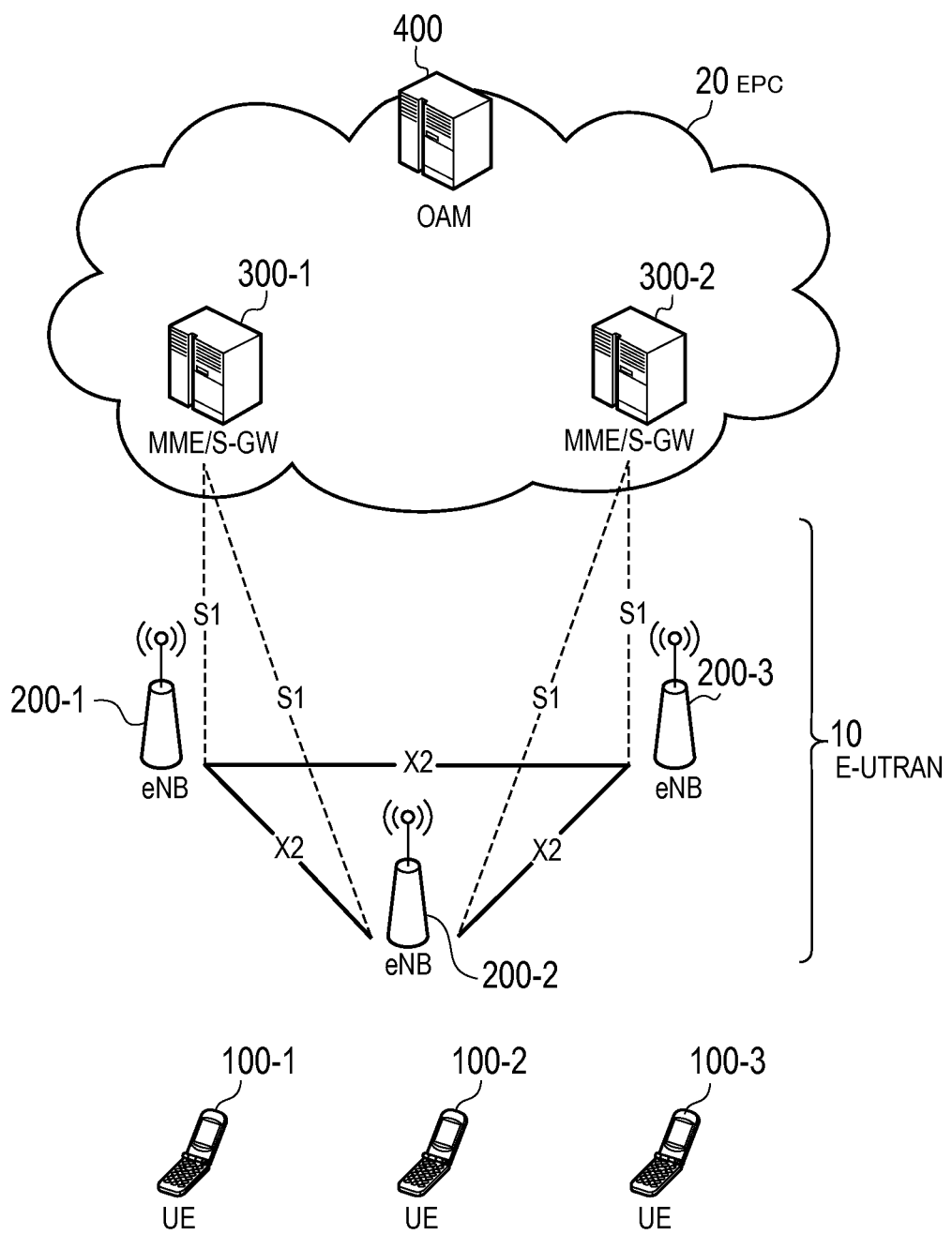
FIG. 1 is a configuration diagram of an LTE system.

A mobile communication system according to an embodiment includes a user terminal (UE 100-1) that transmits a Discovery signal that is used for discovering a communication partner terminal in D2D communication. Here, the "discovery of the communication partner terminal" includes that the user terminal is discovered by the communication partner terminal (Discoverable) as well as that the user terminal discovers the communication partner terminal (Discover).

In the embodiment, the user terminal (UE 100-1) transmits the Discovery signal when the start of communication was accepted and the user terminal (UE 100-1) has difficulty to establish a connection with a base station (eNB 200). In this way, when it is difficult to establish a connection with the base station (eNB 200), the user terminal (UE 100-1) transmits the Discovery signal, so that it is possible to discover a communication partner terminal in the D2D communication, resulting in the avoidance of a state in which communication is not possible. Consequently, it is possible to effectively utilize the D2D communication.

In a first embodiment, the user terminal (UE 100-1) transmits the Discovery signal including communication demand information indicating that the user terminal (UE 100-1) demands the start of the communication, or relay request information for requesting the relay of communication between the user terminal (UE 100-1) and the base station (eNB 200). In this way, another user terminal (UE 100-2) is able to recognize that the user terminal (UE 100-1) serving as a transmission source of the Discovery signal demands communication for relaying the communication between the user terminal (UE 100-1) and the base station (eNB 200), other than normal D2D communication.

In the first embodiment, when the Discovery signal including the communication demand information or the relay request information was received, the other user terminal (UE 100-2) which received the Discovery signal transmits, to the base station (eNB 200), a relay notification signal indicating that the other user terminal (UE 100-2) relays the communication between the user terminal (UE 100-1) and the base station (eNB 200). In this way, the base station (eNB 200) is able to recognize that the other user terminal (UE 100-2) relays the communication of the user terminal (UE 100-1).

In the first embodiment, when the relay notification signal was received from the other user terminal (UE 100-2), the base station (eNB 200) transmits, to the other user terminal (UE 100-2), first scheduling information indicating a radio resource assigned to the D2D communication between the user terminal (UE 100-1) and the other user terminal (UE 100-2), and second scheduling information indicating a radio resource assigned to cellular communication between the other user terminal (UE 100-2) and the base station (eNB 200). In this way, the base station (eNB 200) assigns a radio resource to the D2D communication between the user terminal (UE 100-1) and the other user terminal (UE 100-2)

and assigns a radio resource to the cellular communication between the other user terminal (UE 100-2) and the base station (eNB 200), so that it is possible to ensure a radio resource by which the other user terminal (UE 100-2) relays the communication of the user terminal (UE 100-1).

In a second embodiment, when the start of the D2D communication with a specific user terminal (UE 100-2) was accepted as the start of the communication, the user terminal (UE 100-1) transmits the Discovery signal including identification information for identifying the specific user terminal (UE 100-2). In this way, the specific user terminal (UE 100-2) is able to determine whether a Discovery signal addressed to the specific user terminal (UE 100-2) was received. When it is the Discovery signal addressed to the specific user terminal (UE 100-2), the user terminal (UE 100-1) and the specific user terminal (UE 100-2) start the D2D communication, so that it is possible to effectively utilize the D2D communication.

In the second embodiment, when the specific user terminal (UE 100-2) received the Discovery signal including the identification information and the specific user terminal (UE 100-2) is able to establish a connection with the base station (eNB 200), the specific user terminal (UE 100-2) transmits a reception notification signal (Discovery reception notification signal) indicating the reception of the Discovery signal to the base station (eNB 200). In this way, the base station (eNB 200) is able to recognize that the specific user terminal (UE 100-2) performs the D2D communication with the user terminal UE 100-1.

In the second embodiment, when the specific user terminal (UE 100-2) received the Discovery signal including the identification information and the specific user terminal (UE 100-2) has difficulty to establish a connection with the base station (eNB 200), the user terminal (UE 100-1) or the specific user terminal (UE 100-2) assigns a radio resource that is used in the D2D communication between the user terminal (UE 100-1) and the specific user terminal (UE 100-2). Furthermore, when both the user terminal (UE 100-1) and the specific user terminal (UE 100-2) have difficulty to establish a connection with the base station (eNB 200) (for example, both the user terminal (UE 100-1) and the specific user terminal (UE 100-2) exists out of coverage), the influence of interference from the D2D communication to the cellular communication is small. In this case, even though it is not able to accept the assignment of a radio resource from the base station (eNB 200), the user terminal (UE 100-1) or the other user terminal (UE 100-2) autonomously performs the assignment of a radio resource at the initiative of the terminal, thereby starting the D2D communication.

In the first embodiment and the second embodiment, the other user terminal (UE 100-2) which received the Discovery signal transmits, to the user terminal (UE 100-1), a response signal including connection information (connection enable information or connection disable information) indicating whether the other user terminal (UE 100-2) is able to establish a connection with the base station. In this way, the user terminal (UE 100-1) is able to recognize whether the other user terminal (UE 100-2) which received the Discovery signal is able to establish a connection with the base station (eNB 200) and to determine whether to continue the transmission of the Discovery signal in order to discover a separate user terminal different from the other user terminal (UE 100-2).

In the first embodiment and the second embodiment, the user terminal (UE 100-1) in a mobile communication system, which supports D2D communication that is direct device to device communication, includes a transmission unit (a radio transceiver 110) that transmits the Discovery signal that is used for discovering a communication partner terminal in the D2D communication, wherein the transmission unit (the radio transceiver 110) transmits the Discovery signal when the start of communication was accepted and the user terminal (UE 100-1) has difficulty to establish a connection with a base station.

In the first embodiment and the second embodiment, a processor (a processor 160), which is provided in the user terminal (UE 100-1) in the mobile communication system supporting the D2D communication that is direct device to device communication, performs a process of transmitting the Discovery signal that is used for discovering a communication partner terminal in the D2D communication, and performs a process of transmitting the Discovery signal when the start of communication was accepted and the user terminal (UE 100-1) has difficulty to establish a connection with the base station (eNB 200).

In the first embodiment and the second embodiment, the user terminal (UE 100-2) in a mobile communication system, which supports D2D communication that is direct device to device communication, includes a reception unit (the radio transceiver 110), which receives the Discovery signal that is used for discovering a communication partner terminal in the D2D communication from another user terminal (UE 100-1), and a transmission unit (the radio transceiver 110) that transmits, to the other user terminal (UE 100-1), a response signal (Discovery response signal) including connection information (connection enable information or connection disable information) indicating whether the user terminal (UE 100-2) is able to establish a connection with the base station (eNB 200) when the reception unit (the radio transceiver 110) received the Discovery signal.

In the first embodiment, the base station (eNB 200) in a mobile communication system, which supports D2D communication that is direct device to device communication, includes a reception unit (a radio transceiver 210), which receives a relay notification signal from another user terminal (UE 100-2) that received the Discovery signal transmitted from the user terminal (UE 100-1), the relay notification signal indicating that the other user terminal (UE 100-2) relays communication between the user terminal (UE 100-1) and the base station eNB 200, and a transmission unit (the radio transceiver 210) that transmits, to the other user terminal (UE 100-2), first scheduling information indicating a radio resource assigned to the D2D communication between the user terminal (UE 100-1) and the other user terminal (UE 100-2), and second scheduling information indicating a radio resource assigned to cellular communication between the other user terminal (UE 100-2) and the base station (eNB 200) when the reception unit (the radio transceiver 210) received the relay notification signal, wherein the Discovery signal is used for discovering a communication partner terminal in the D2D communication.

In the first embodiment, a processor (a processor 240), which is provided in a base station in a mobile communication system supporting the D2D communication that is direct device to device communication, performs a process of receiving a relay notification signal from another user terminal (UE 100-2) that received the Discovery signal transmitted from the user terminal (UE 100-1), the relay notification signal indicating that the other user terminal (UE 100-2) relays communication between the user terminal (UE 100-1) and the base station (eNB 200), and performs a process of transmitting, to the other user terminal (UE 100-2), first scheduling information indicating a radio resource assigned to the D2D communication between the user terminal (UE 100-1) and the other user terminal (UE 100-2), and second scheduling information indicating a radio resource assigned to cellular communication between the other user terminal (UE 100-2) and the base station (eNB 200) when the process of receiving the relay notification signal was performed, wherein the Discovery signal is used for discovering a communication partner terminal in the D2D communication.

Hereinafter, with reference to the accompanying drawings, the following description will be provided for each embodiment when D2D communication is introduced to a cellular mobile communication system (hereinafter, an "LTE system") configured according to 3GPP standards.

[First Embodiment]

(LTE System)

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal. It is noted that in the present embodiment, a connection between the UE 100 and the eNB 200 is sometimes used for the same meaning as a connection between the UE 100 and the cell.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
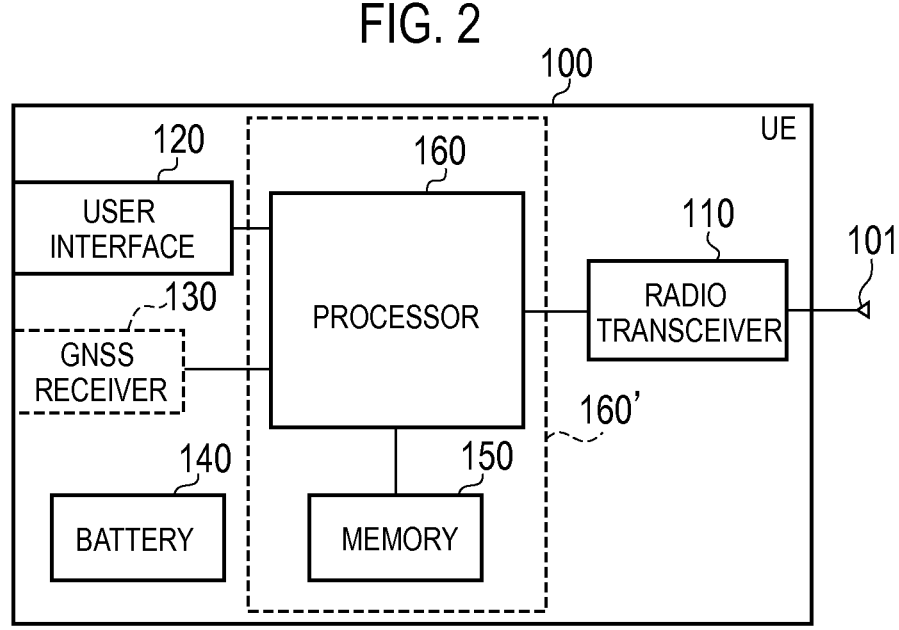
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
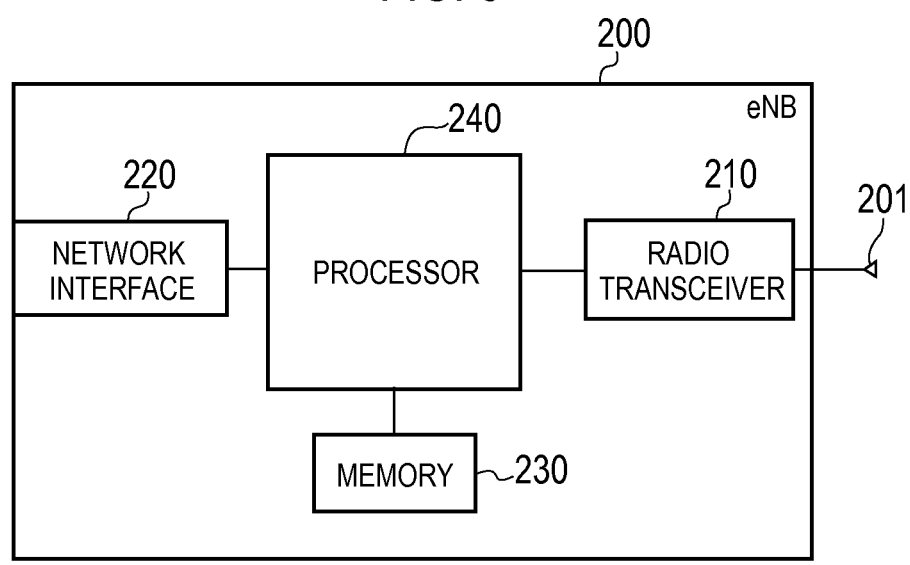
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. It is noted that the memory 230 may be integrally formed with the processor 240, and this set (that is, a chipset) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

(D2D Communication)

Next, a description is given with comparing the D2D communication with the normal communication (the cellular communication) in the LTE system.

Figure 4:
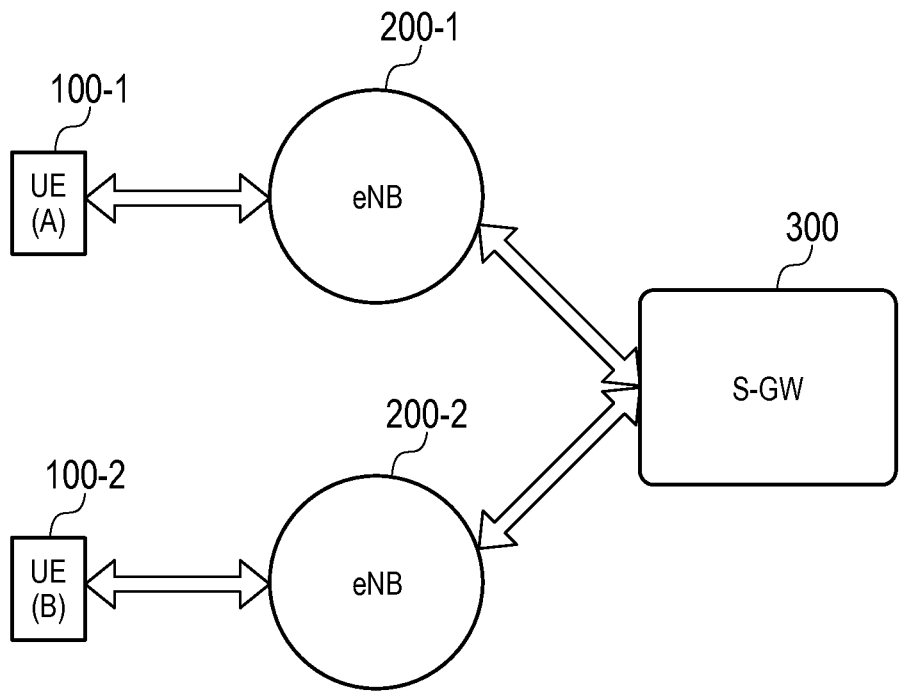
FIG. 4 is a diagram illustrating a data path in cellular communication.

FIG. 4 is a diagram illustrating a data path in the cellular communication. In this case, FIG. 4 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 4, the data path of the cellular communication goes through a network. Specifically, the data path is set to pass through the eNB 200-1, the S-GW 300, and the eNB 200-2.

Figure 5:
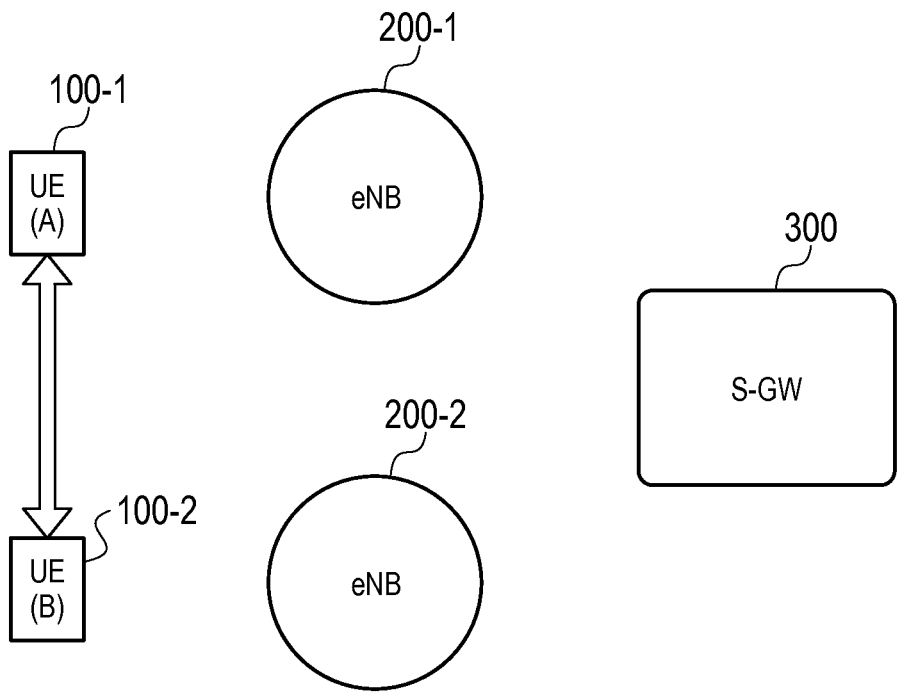
FIG. 5 is a diagram illustrating a data path in D2D communication.

FIG. 5 is a diagram illustrating a data path in the D2D communication. In this case, FIG. 5 illustrates the case in which the D2D communication is performed between the UE 100-1 that establishes a connection with the eNB 200-1 and the UE 100-2 that establishes a connection with the eNB 200-2.

As illustrated in FIG. 5, the data path of the D2D communication does not go through a network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. In addition, in a mode called Locally Routed, a data path goes through the eNB 200 without going through the S-GW 300.

It is noted that there are a case (a) that the D2D communication starts after a partner terminal is discovered by performing an operation for discovery of the partner terminal and a case (b) that the D2D communication starts without the operation for discovery of a partner terminal, as a case of the D2D communication starting.

In the case (a), for example, the UE 100 being one of the UE 100-1 and the UE 100-2 discoveries the other UE 100 existing in the proximity of the UE100, and then the D2D communication starts.

In this case, the UE 100 has a (Discovery) function of discovering the other UE 100 existing in the proximity of the UE100 and/or a (Discoverable) function of being discovered by the other UE 100.

Also, it is not necessary for the UE 100 to perform the D2D communication even though the UE 100 discoveries the partner terminal. For example, the UE 100-1 and the UE 100-2 negotiate after the discovery of each other, and then the UE 100-1 and the UE 100-2 determine whether to perform the D2D communication. The D2D communication starts when each of the UE 100-1 and the UE 100-2 agrees with performing the D2D communication.

On the other hand, in the case (b), for example, the UE 100-1 starts informing a signal for the D2D communication by broadcast. Thus, the UE 100 can start the D2D communication regardless of whether to discover the partner terminal.

(Operation of Mobile Communication System According to First Embodiment)

Next, the operation of the mobile communication system according to the first embodiment will be described in the sequence of (1A) Entire operation, (2A) Operation of UE 100-1, (3A) Operation of UE 100-2, and (4A) Operation of eNB 200.

In the first embodiment, a description will be provided for a sequence when a user of the UE 100-1 performed a communication start operation that the user did not employ the UE 100-2 as a communication partner. For example, the user of the UE 100-1 performs an operation for viewing a Web site by using a Web view application.

(1A) Entire Operation

With reference to FIG. 6A, FIG. 6B, and FIG. 7, the entire operation will be described. FIG. 6A and FIG. 6B are diagrams illustrating a positional relation between the UE 100 and the eNB 200.

As illustrated in FIG. 6A, the UE 100-1 is located out of a cell 250 managed by the eNB 200. That is, the UE 100-1 exists out of coverage, and the received level of a reference signal received from the eNB 200 is smaller than a predetermined threshold value. Accordingly, the UE 100-1 has difficulty to establish a connection with the eNB 200. Meanwhile, the UE 100-2 is located in the cell 250 managed by the eNB 200. That is, the UE 100-2 exists in coverage, and the received level of the reference signal received from the eNB 200 is equal to or more than the predetermined threshold value. Accordingly, the UE 100-2 is able to establish a connection with the eNB 200.

As illustrated in FIG. 6B, the UE 100-1 and the UE 100-2 are located out of the cell 250 managed by the eNB 200 and have difficulty to establish a connection with the eNB 200, similarly to the UE 100-1 of FIG. 6A.

FIG. 7 is an example of a sequence diagram of the entire operation according to the first embodiment.

As illustrated in FIG. 7, in step 101, a user of the UE 100-1 performs an operation for starting communication. In this way, the UE 100-1 accepts the start of communication with the eNB 200.

In step 102, the UE 100-1 determines whether it is possible to establish a connection with the eNB 200. In the present embodiment, as illustrated in FIG. 6A and FIG. 6B, since the received level of the reference signal received from the eNB 200 is smaller than the predetermined threshold value, the UE 100-1 determines to have difficulty to establish a connection with the eNB 200.

In step 103, the UE 100-1 transmits a Discovery signal for discovering another UE 100 existing in the vicinity of the UE 100-1. The Discovery signal corresponds to a signal for discovery that is used for discovering a communication partner terminal in the D2D communication. In the present embodiment, the Discovery signal includes communication demand information indicating that the UE 100-1 demands the start of communication, or relay request information for requesting the relay of communication between the UE 100-1 and the eNB 200. In addition, the Discovery signal includes information for identifying the UE 100-1 that transmitted the Discovery signal.

The UE 100-2 existing in the vicinity of the UE 100-1 receives the Discovery signal transmitted from the UE 100-1. Based on the communication demand information and the relay request information, the UE 100-2 determines that the UE 100-1 demands communication for relaying between the UE 100-1 and the eNB 200.

In step 104, the UE 100-2 determines whether it is possible to establish a connection with the eNB 200. Specifically, the UE 100-2 determines whether the received level of the reference signal received from the eNB 200 is smaller than the predetermined threshold value.

As illustrated in FIG. 6A, when the UE 100-2 exists in coverage, that is, when the received level of the reference signal received from the eNB 200 is equal to or more than the predetermined threshold value and it is possible to establish a connection with the eNB 200 (step 104: Yes), the UE 100-2 performs processes of step 105 and step 106.

On the other hand, as illustrated in FIG. 6B, when the UE 100-2 exists out of coverage, that is, when the received level of the reference signal received from the eNB 200 is smaller than the predetermined threshold value and it is difficult to establish a connection with the eNB 200 (step 104: No), the UE 100-2 performs a process of step 111.

In addition, as will be described later, the UE 100-2 may determine whether to approve communication for relaying between the UE 100-1 and the eNB 200.

In step 105, the UE 100-2 transmits a response signal (hereinafter, a Discovery response signal) for the Discovery signal to the UE 100-1. The Discovery response signal may include connection enable information indicating that the UE 100-2 is able to establish a connection with the eNB 200.

In step 106, the UE 100-2 transmits a relay notification signal to the eNB 200. The relay notification signal is a signal indicating that the UE 100-2 relays communication between the UE 100-1 and the eNB 200.

In step 107, the eNB 200 that received the relay notification signal performs the assignment (scheduling) of a radio resource (for example, resource blocks of PDSCH and PUSCH). Specifically, the eNB 200 performs the assignment of a radio resource to be used in communication (D2D communication) between the UE 100-1 and the UE 100-2, and the assignment of a radio resource to be used in communication (cellular communication) between the UE 100-2 and the eNB 200. In this way, since the D2D communication is performed under the control of a network (the eNB 200), even though the D2D communication is performed in a frequency band of the LTE system, it is possible to avoid interference to the cellular communication, for example.

In step 108, the eNB 200 transmits scheduling information to the UE 100-2. The scheduling information includes first scheduling information and second scheduling information. Specifically, the first scheduling information is information indicating a radio resource assigned to the D2D communication between the UE 100-1 and the UE 100-2. Furthermore, the second scheduling information is information indicating a radio resource assigned to the cellular communication between the UE 100-2 and the eNB 200.

In step 109, the UE 100-1 and the UE 100-2 perform exchange (negotiation) of information to be used for establishing a D2D link. The information to be used for establishing the D2D link, for example, is the first scheduling information. In this way, the D2D link is established between the UE 100-1 and the UE 100-2.

In step 110, the UE 100-1 and the eNB 200 transmit and receive data via the UE 100-2.

Meanwhile, when the UE 100-2 has difficulty to establish a connection with the eNB 200 (step 104: No), the UE 100-2 transmits the Discovery response signal to the UE 100-1 in step 111. The Discovery response signal may include connection disable information indicating that the UE 100-2 is not able to establish a connection with the eNB 200.

(2A) Operation of UE 100-1

With reference to FIG. 8, the operation of the UE 100-1 will be described. FIG. 8 is a flowchart illustrating the operation of the UE 100-1 according to the first embodiment.

As illustrated in FIG. 8, in step 201, the UE 100-1 accepts the start of communication. In the present embodiment, a user of the UE 100-1 performs an operation of communication start with respect to the user interface 120 of the UE 100-1. For example, the user of the UE 100-1 inputs or designates information (URL and the like of a Web page) indicating a connection destination with respect to the user interface 120. Through the operation, a signal indicating the start of communication is input to the processor 160 of the UE 100-1.

In addition, the memory 150 of the UE 100-1 may store information indicating the input or designated connection destination.

In step 202, the processor 160 of the UE 100-1 determines whether the received level of the reference signal received in the radio transceiver 110 from the eNB 200 is smaller than the predetermined threshold value. For example, the processor 160 of the UE 100-1 determines whether RSRP (Reference Signal Received Power) or RSSI (Reference Signal Strength Indication) is smaller than the predetermined threshold value. Instead of the received level of the reference signal, the processor 160 of the UE 100-1 may determine whether the radio quality (for example, SNR (Signal-Noise Ratio)) of the reference signal received in the radio transceiver 110 from the eNB 200 is smaller than the predetermined threshold value. When the received level is equal to or more than the predetermined threshold value, the processor 160 of the UE 100-1 determines that it is possible to establish a connection with the eNB 200. In this case (step 202: No), the processor 160 of the UE 100-1 performs a process of step 203. Meanwhile, when the received level is smaller than the predetermined threshold value, the processor 160 of the UE 100-1 determines that it is difficult to establish a connection with the eNB 200. In this case (step 202: Yes), the processor 160 of the UE 100-1 performs a process of step 204.

For example, the predetermined threshold value is a value indicating that the radio transceiver 110 of the UE 100-1 is not able to receive the reference signal from the eNB 200 and it is not possible to establish a connection with the eNB 200. Alternatively, the predetermined threshold value may be a value indicating that the reference signal received in the radio transceiver 110 of the UE 100-1 from the eNB 200 is weak and it is difficult to establish a connection with the eNB 200.

In step 203, the processor 160 of the UE 100-1 performs normal communication (cellular communication). Specifically, the processor 160 of the UE 100-1 controls the radio transceiver 110 to transmit and receive data through the cellular communication.

On the other hand, in step 204, the processor 160 of the UE 100-1 controls the radio transceiver 110 to transmit the Discovery signal.

In addition, the Discovery signal includes identification information for identifying the UE 100-1. The identification information, for example, includes a phone number and a fixed IP address. The identification information may include a country code and/or a random number, in addition to the phone number.

Furthermore, in the present embodiment, the Discovery signal includes communication demand information indicating that the UE 100-1 demands the start of communication with the eNB 200, or relay request information for requesting the relay of communication between the UE 100-1 and the eNB 200.

In step 205, the processor 160 of the UE 100-1 determines whether a response signal was received before a predetermined time lapses after the Discovery signal is transmitted, wherein the response signal indicates that the UE 100-2 approved communication. Before the predetermined time lapses, when the radio transceiver 110 of the UE 100-1 was not able to receive the response signal (step 205: No), the processor 160 of the UE 100-1 performs a process of step 206. Before the predetermined time lapses, when the radio transceiver 110 of the UE 100-1 was able to receive the response signal (step 205: Yes), the processor 160 of the UE 100-1 performs a process of step 207.

In addition, instead of the response signal indicating that the UE 100-2 approved communication, when the radio transceiver 110 of the UE 100-1 received the Discovery response signal indicating that the UE 100-2 received the Discovery signal, the processor 160 of the UE 100-1 may determine that the response signal was received.

In step 206, the processor 160 of the UE 100-1 displays time-out information (Time Out information) on a display included in the user interface 120, thereby ending the process. In this way, a user is able to recognize that it is not possible to perform communication.

In step 207, the processor 160 of the UE 100-1 performs exchange (negotiation) of information to be used for establishing a D2D link with the UE 100-2, thereby establishing the D2D link. Specifically, firstly, the processor 160 of the UE 100-1 controls the radio transceiver 110 to receive a signal indicating that communication is performed from the UE 100-2. Secondly, the processor 160 of the UE 100-1 controls the radio transceiver 110 to transmit and receive data required for establishing the D2D link. Thirdly, the processor 160 of the UE 100-1 establishes the D2D link corresponding to a radio resource assigned using the first scheduling information.

After establishing the D2D link, the processor 160 of the UE 100-1 automatically accesses a connection destination on the basis of information indicating the connection destination, which is stored in the memory 150. Alternatively, the processor 160 of the UE 100-1 may display a screen for instructing the input of the connection destination on the display included in the user interface 120, in order to allow the user of the UE 100-1 to input or designate the information indicating the connection destination.

In step 208, the processor 160 of the UE 100-1 controls the radio transceiver 110 to transmit and receive data to and from the eNB 200 via the UE 100-2.

In addition, when the data transmission and reception is ended, the processor 160 of the UE 100-1 ends the communication. In this case, the processor 160 of the UE 100-1 may control the radio transceiver 110 to transmit a signal indicating the end of the communication to the UE 100-2. Furthermore, when the signal indicating the end of the communication is received from the UE 100-2 by the radio transceiver 110, the processor 160 of the UE 100-1 may end the communication.

(3A) Operation of UE 100-2

With reference to FIG. 9, the operation of the UE 100-2 will be described. FIG. 9 is a flowchart illustrating the operation of the UE 100-2 according to the first embodiment.

As illustrated in FIG. 9, in step 301, the radio transceiver 110 of the UE 100-2 receives the Discovery signal from the UE 100-1. The Discovery signal includes communication demand information or relay request information. In addition, the processor 160 of the UE 100-2 may control the radio transceiver 110 of the UE 100-2 to periodically attempt the reception of the Discovery signal.

On the basis of the communication demand information or the relay request information included in the Discovery signal, the processor 160 of the UE 100-2 determines that the UE 100-1 demands communication for relaying between the UE 100-1 and the eNB 200, other than normal D2D communication.

In step 302, the processor 160 of the UE 100-2 confirms with a user of the UE 100-2 whether to approve the communication for relaying between the UE 100-1 and the eNB 200. When the user approved to perform the communication (step 302: Yes), the processor 160 of the UE 100-2 performs a process of step 303. When the user did not approve to perform the communication (step 302: No), the processor 160 of the UE 100-2 performs a process of step 304.

Furthermore, the confirmation with the user of the UE 100-2, for example, is performed by displaying a confirmation screen indicating whether to perform the communication for relaying between the UE 100-1 and the eNB 200 on the display included in the user interface 120. When a signal indicating that the communication was performed was input to the processor 160 of the UE 100-2 by an operation of the user, the processor 160 of the UE 100-2 determines that the user approved to perform the communication. Meanwhile, when a signal indicating that the communication was not performed was input to the processor 160 of the UE 100-2 by an operation of the user or when a signal was not input to the processor 160 of the UE 100-2 for a predetermined time, the processor 160 of the UE 100-2 determines that the user did not approve to perform the communication.

In addition, when the radio transceiver 110 of the UE 100-2 received the Discovery signal from of the UE 100-1, the processor 160 of the UE 100-2 may perform the process of step 303 without performing the confirmation with the user. For example, when the Discovery signal includes the relay request information, the processor 160 of the UE 100-2 may also perform the process of step 303 according to a condition set in advance by the user of the UE 100-2 without performing the confirmation with the user (that is, without performing the process of step 302).

In step 303, the processor 160 of the UE 100-2 determines whether the received level of the reference signal received in the radio transceiver 110 from the eNB 200 is smaller than a predetermined threshold value. The determination method is the same as that of the UE 100-1.

In addition, the predetermined threshold value may be the same threshold value as that of the UE 100-1, or a separate threshold value. When the received level is smaller than the predetermined threshold value (step 303: Yes), the processor 160 of the UE 100-2 performs the process of step 304. Meanwhile, when the received level is equal to or more than the predetermined threshold value (step 303: No), the processor 160 of the UE 100-2 performs a process of step 305.

In step 304, the processor 160 of the UE 100-2 controls the radio transceiver 110 to transmit a Discovery response signal to the UE 100-1.

In addition, the Discovery response signal may include information indicating that the UE 100-2 performs no communication for relaying between the UE 100-1 and the eNB 200, or connection disable information indicating that the UE 100-2 has difficulty to establish a connection with the eNB 200.

In step 305, the processor 160 of the UE 100-2 controls the radio transceiver 110 to transmit a Discovery response signal to the UE 100-1.

In addition, the Discovery response signal may include information indicating that the UE 100-2 performs the communication for relaying between the UE 100-1 and the eNB 200, or connection enable information indicating that the UE 100-2 is able to establish a connection with the eNB 200.

In step 306, the processor 160 of the UE 100-2 controls the radio transceiver 110 to transmit a relay notification signal to the eNB 200. Furthermore, the relay notification signal is a signal indicating that the UE 100-2 relays the communication between the UE 100-1 and the eNB 200. In addition, at the time at which the Discovery response signal was received, when the UE 100-2 is in an idle state and a connection with the eNB 200 has not been established (there is no RRC connection between RRC of the UE 100-2 and RRC of the eNB 200), the processor 160 of the UE 100-2 establishes a connection with the eNB 200.

In step 307, the radio transceiver 110 of the UE 100-2 receives scheduling information from the eNB 200. Furthermore, the scheduling information includes first scheduling information and second scheduling information.

In step 308, the processor 160 of the UE 100-2 performs exchange (negotiation) of information to be used for establishing a D2D link with the UE 100-1, thereby establishing the D2D link. Specifically, firstly, the processor 160 of the UE 100-2 controls the radio transceiver 110 to transmit a signal indicating that D2D communication is performed. Secondly, the processor 160 of the UE 100-2 controls the radio transceiver 110 to transmit and receive data required for establishing the D2D communication. Thirdly, the processor 160 of the UE 100-2 establishes the D2D link corresponding to a radio resource assigned by using the first scheduling information. Moreover, the processor 160 of the UE 100-2 establishes a connection with the eNB 200 in response to a radio resource assigned by using the second scheduling information.

In step 309, the processor 160 of the UE 100-2 controls the radio transceiver 110 to transmit data received from the UE 100-1 to the eNB 200, and to transmit data received from the eNB 200 to the UE 100-1.

In addition, when the radio transceiver 110 receives a signal indicating the end of the communication from the UE 100-1, the processor 160 of the UE 100-2 ends the communication. Furthermore, when there is input indicating the end of the communication, the processor 160 of the UE 100-2 may end the communication before data transmission and reception between the UE 100-1 and the eNB 200 is ended. In this case, the processor 160 of the UE 100-2 may control the radio transceiver 110 to transmit a signal indicating the end of the communication to the UE 100-1 and the eNB 200.

(4A) Operation of eNB 200

With reference to FIG. 10, the operation of the eNB 200 will be described. FIG. 10 is a flowchart illustrating the operation of the eNB 200 according to the first embodiment.

As illustrated in FIG. 10, in step 401, the radio transceiver 210 of the eNB 200 receives the relay notification signal from the UE 100-2.

In step 402, the processor 240 of the eNB 200 which received the relay notification signal from the UE 100-2 performs scheduling of a radio resource. Specifically, the processor 240 of the eNB 200 assigns a radio resource to D2D communication between the UE 100-1 and the UE 100-2. Furthermore, the processor 240 of the eNB 200 assigns a radio resource to cellular communication between the UE 100-2 and the eNB 200. The processor 240 of the eNB 200 assigns the radio resource in consideration of the D2D communication between the UE 100-1 and the UE 100-2 and the cellular communication between the UE 100-2 and the eNB 200.

In step 403, the processor 240 of the eNB 200 controls the radio transceiver 210 to transmit scheduling information to the UE 100-2. Furthermore, the scheduling information includes first scheduling information indicating a radio resource assigned to the D2D communication between the UE 100-1 and the UE 100-2, and second scheduling information indicating a radio resource assigned to the cellular communication between the UE 100-2 and the eNB 200. In addition, the processor 240 of the eNB 200 may control the radio transceiver 210 to transmit the first scheduling information separately from the second scheduling information.

In step 404, the processor 240 of the eNB 200 controls the radio transceiver 210 to transmit and receive data to and from the UE 100-1 via the UE 100-2.

(Summary of First Embodiment)

The UE 100-1 according to the present embodiment transmits the Discovery signal when the start of communication was accepted and the UE 100-1 has difficulty to establish a connection with the eNB 200. In this way, when it is difficult to establish a connection with the eNB 200, the UE 100-1 transmits the Discovery signal, so that it is possible to discover a communication partner terminal in the D2D communication, resulting in the avoidance of a state in which communication is not possible. Consequently, it is possible to effectively utilize the D2D communication.

In the present embodiment, the UE 100-1 transmits the Discovery signal including the communication demand information indicating that the UE 100-1 demands the start of communication, or the relay request information for requesting the relay of communication between the UE 100-1 and the eNB 200. In this way, the UE 100-2 that received the Discovery signal is able to recognize that the UE 100-1 serving as a transmission source of the Discovery signal demands communication for relaying the communication between the UE 100-1 and the eNB 200, other than normal D2D communication.

In the present embodiment, when the Discovery signal including the communication demand information or the relay request information was received, the UE 100-2 that received the Discovery signal transmits, to the eNB 200, a relay notification signal indicating that the UE 100-2 relays the communication between the UE 100-1 and the eNB 200. In this way, the eNB 200 is able to recognize that the UE 100-2 relays the communication of the UE 100-1.

In the present embodiment, when the relay notification signal was received from the UE 100-2, the eNB 200 transmits, to the UE 100-2, the first scheduling information indicating a radio resource assigned to the D2D communication between the UE 100-1 and the UE 100-2, and the second scheduling information indicating a radio resource assigned to the cellular communication between the UE 100-2 and the eNB 200. In this way, the eNB 200 assigns a radio resource to the D2D communication between the UE 100-1 and the UE 100-2 and assigns a radio resource to the cellular communication between the UE 100-2 and the eNB 200, so that it is possible to ensure a radio resource by which the UE 100-2 relays the communication of the UE 100-1.

In the present embodiment, the UE 100-2 that received the Discovery signal may transmit, to the UE 100-1, the Discovery response signal including connection enable information indicating that the UE 100-2 is able to establish a connection with the eNB 200. In this way, the UE 100-1 that received the Discovery response signal including the connection enable information is able to recognize that the UE 100-2 that received the Discovery signal is able to establish a connection with the eNB 200 and to determine not to continue the transmission of the Discovery signal in order to discover a separate UE 100 different from the UE 100-2.

Furthermore, in the present embodiment, the UE 100-2 that received the Discovery signal may transmit, to the UE 100-1, the Discovery response signal including connection disable information indicating that the UE 100-2 is not able to establish a connection with the eNB 200. In this way, the UE 100-1 that received the Discovery response signal including the connection disable information is able to recognize that the UE 100-2 that received the Discovery signal is not able to establish a connection with the eNB 200 and to determine to continue the transmission of the Discovery signal in order to discover a separate UE 100 different from the UE 100-2.

[Second Embodiment]

Hereinafter, the second embodiment will be described while focusing on the differences from the first embodiment.

(Operation of Mobile Communication System According to Second Embodiment)

The operation of the mobile communication system according to the second embodiment will be described in the sequence of (1B) Entire Operation, (2B) Operation of UE 100-1, (3B) Operation of UE 100-2, and (4B) Operation of eNB 200.

In the second embodiment, a description will be provided for a sequence when a user of the UE 100-1 performed a communication start operation by employing the UE 100-2 as a communication partner. For example, the user of the UE 100-1 performs an operation for talking with a user of a specific communication partner (UE 100-2) by using a voice call application. Alternatively, the user of the UE 100-1 performs an operation for transmitting E-mail to the specific communication partner (UE 100-2) by using an E-mail application.

(1B) Entire Operation

Figure 11:
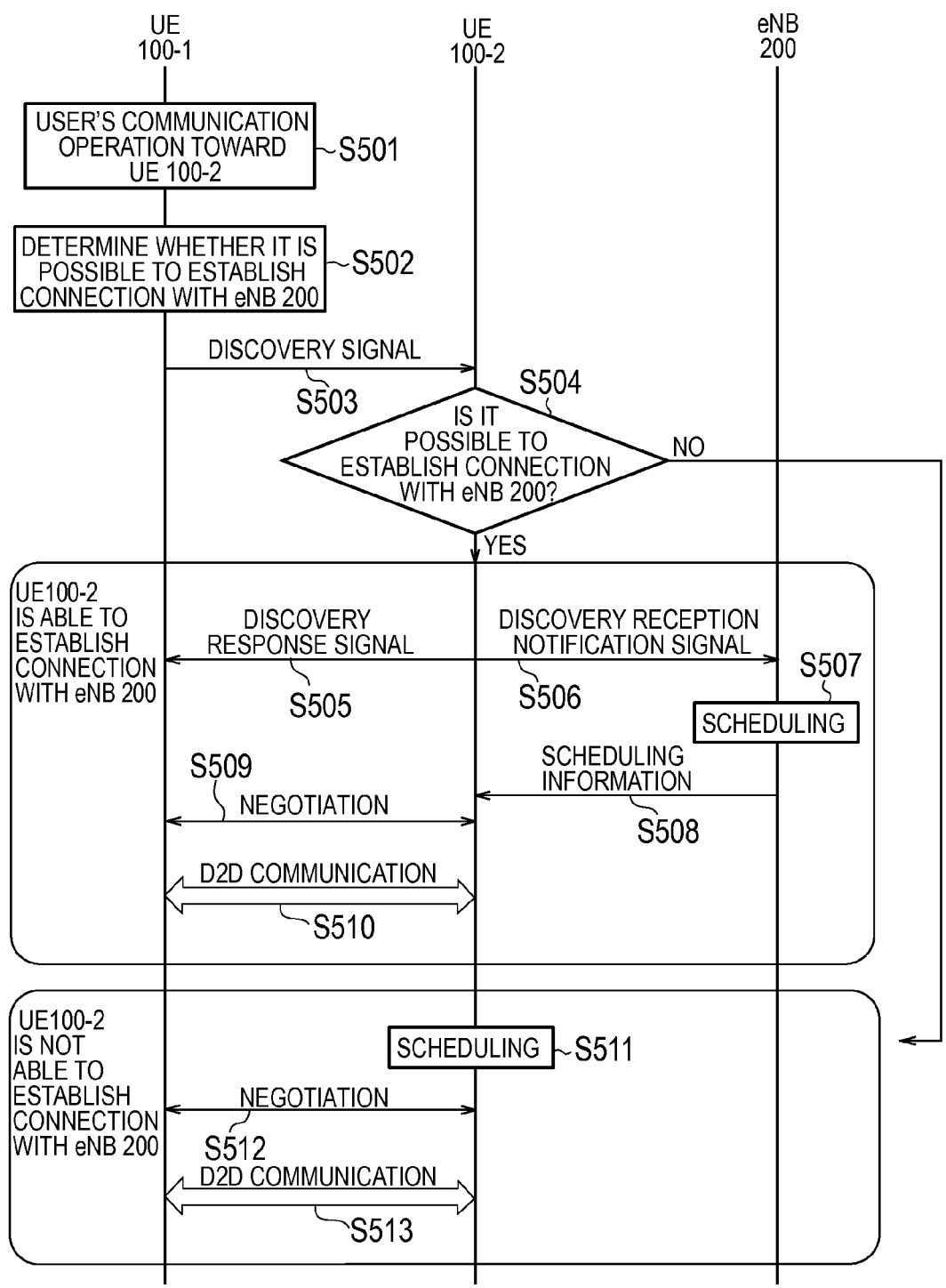
FIG. 11 is an example of a sequence diagram of an entire operation according to a second embodiment.

With reference to FIG. 6A, FIG. 6B, and FIG. 11, the entire operation will be described. FIG. 11 is an example of a sequence diagram of the entire operation according to the second embodiment.

As illustrated in FIG. 11, in step 501, a user of the UE 100-1 performs an operation for starting communication toward the specific communication partner (UE 100-2).

In step 502, the UE 100-1 determines whether it is possible to establish a connection with the eNB 200. Also in the present embodiment, the UE 100-1 determines to have difficulty to establish a connection with the eNB 200, similarly to the first embodiment.

In step 503, the UE 100-1 transmits a Discovery signal. The Discovery signal includes identification information for identifying the UE 100-2.

The UE 100-2 existing in the vicinity of the UE 100-1 receives the Discovery signal transmitted from the UE 100-1. Based on the identification information, the UE 100-2 determines that the UE 100-1 demands D2D communication with the UE 100-2.

In step 504, the UE 100-2 determines whether it is possible to establish a connection with the eNB 200. Step 504 is a step corresponding to step 104.

As illustrated in FIG. 6A, when the UE 100-2 exists in coverage, that is, when the received level of the reference signal received from the eNB 200 is equal to or more than the predetermined threshold value and it is possible to establish a connection with the eNB 200 (step 504: Yes), the UE 100-2 performs processes of step 505 and step 506.

On the other hand, as illustrated in FIG. 6B, when the UE 100-2 exists out of coverage, that is, when the received level of the reference signal received from the eNB 200 is smaller than the predetermined threshold value and it is difficult to establish a connection with the eNB 200 (step 504: No), the UE 100-2 performs a process of step 511.

In addition, as will be described later, the UE 100-2 may determine whether to approve D2D communication with the UE 100-1.

In step 505, the UE 100-2 transmits a Discovery response signal to the UE 100-1. The Discovery response signal may include connection enable information indicating that the UE 100-2 is able to establish a connection with the eNB 200.

In step 506, the UE 100-2 transmits a reception notification signal (hereinafter, a Discovery reception notification signal) to the eNB 200, wherein the Discovery reception notification signal indicates that the Discovery signal was received. Alternatively, instead of the Discovery reception notification signal, the UE 100-2 may transmit a D2D request signal for requesting the start of D2D communication to the eNB 200.

In step 507, the eNB 200 that received the Discovery reception notification signal (or the D2D request signal) performs the assignment (scheduling) of a radio resource.

In step 508, the eNB 200 transmits scheduling information to the UE 100-2.

In step 509, the UE 100-1 and the UE 100-2 perform exchange (negotiation) of information to be used for establishing a D2D link. In this way, the D2D link is established between the UE 100-1 and the UE 100-2.

In step 510, the UE 100-1 and the UE 100-2 directly transmit and receive data without going through the eNB 200. That is, the UE 100-1 and the UE 100-2 perform the D2D communication.

Meanwhile, when it is difficult for the UE 100-2 to establish a connection with the eNB 200 (step 504: No), the UE 100-2 performs the assignment (scheduling) of a radio resource in step 511. Specifically, the UE 100-2 autonomously selects a radio resource to be used in the D2D communication between the UE 100-1 and the UE 100-2 from radio resources available in the D2D communication.

Step 512 corresponds to step 509 and step 513 corresponds to step 510.

(2B) Operation of UE 100-1

With reference to FIG. 12, the operation of the UE 100-1 will be described. FIG. 12 is a flowchart illustrating the operation of the UE 100-1 according to the second embodiment.

As illustrated in FIG. 12, in step 601, the UE 100-1 accepts the start of communication toward a specific communication partner. In the present embodiment, a user of the UE 100-1 performs an operation for starting communication toward the specific communication partner (UE 100-2) with respect to the user interface 120 of the UE 100-1. Through the operation, a signal indicating the start of communication toward the UE 100-2 is input to the processor 160 of the UE 100-1.

In step 602, the processor 160 of the UE 100-1 determines whether the received level of the reference signal received in the radio transceiver 110 from the eNB 200 is smaller than the predetermined threshold value. When the received level is equal to or more than the predetermined threshold value (step 602: No), the processor 160 of the UE 100-1 performs a process of step 603. Meanwhile, when the received level is smaller than the predetermined threshold value (step 602: Yes), the processor 160 of the UE 100-1 performs a process of step 604.

In step 603, the processor 160 of the UE 100-1 performs normal communication (cellular communication). Specifically, the processor 160 of the UE 100-1 controls the radio transceiver 110 to transmit and receive data to and from the UE 100-2.

On the other hand, in step 604, the processor 160 of the UE 100-1 confirms with a user of the UE 100-1 whether to perform D2D communication with the UE 100-2.

The confirmation with the user, for example, is performed by displaying a confirmation screen indicating whether to perform the D2D communication with the UE 100-2 on the display included in the user interface 120 of the UE 100-1. When a signal indicating that the D2D communication was performed was input to the processor 160 of the UE 100-1 by an operation of the user, the processor 160 of the UE 100-1 determines that the user selected to perform the D2D communication. In this way, the processor 160 of the UE 100-1 accepts the start of the D2D communication with the UE 100-2.

When a signal indicating that the D2D communication was not performed was input to the processor 160 of the UE 100-1 by an operation of the user or when a signal was not input to the processor 160 of the UE 100-1 for a predetermined time, the processor 160 of the UE 100-1 determines that the user did not select to perform the D2D communication.

When the user did not select to perform the D2D communication with the UE 100-2 (step 604: No), the processor 160 of the UE 100-1 ends the process. When the user selected to perform the D2D communication with the UE 100-2 (step 604: Yes), the processor 160 of the UE 100-1 performs a process of step 605.

In step 605, the processor 160 of the UE 100-1 controls the radio transceiver 110 to transmit a Discovery signal. Furthermore, the Discovery signal includes identification information for identifying the UE 100-2 that is the specific communication partner.

Each of step 606 to step 608 corresponds to each of step 205 to step 207 of the first embodiment.

In step 609, the processor 160 of the UE 100-1 controls the radio transceiver 110 to transmit and receive data to and from the UE 100-2 through the D2D communication.

(3B) Operation of UE 100-2

With reference to FIG. 13, the operation of the UE 100-2 will be described. FIG. 13 is a flowchart illustrating the operation of the UE 100-2 according to the second embodiment.

As illustrated in FIG. 13, in step 701, the radio transceiver 110 of the UE 100-2 receives the Discovery signal from the UE 100-1. The Discovery signal includes the identification information for identifying the UE 100-2.

The processor 160 of the UE 100-2 determines that the UE 100-1 demands D2D communication with the UE 100-2, based on the identification information.

In step 702, the processor 160 of the UE 100-2 confirms with a user of the UE 100-2 whether to approve the D2D communication with the UE 100-1. When the user approved to perform the communication (step 702: Yes), the processor 160 of the UE 100-2 performs a process of step 703. When the user did not approve to perform the communication (step 702: No), the processor 160 of the UE 100-2 performs a process of step 704.

Furthermore, a method for confirming with the user by the processor 160 of the UE 100-2 is the same as the confirmation method of step 302 of the first embodiment.

In step 703, the processor 160 of the UE 100-2 determines whether the received level of the reference signal received in the radio transceiver 110 from the eNB 200 is smaller than the predetermined threshold value. When the received level is smaller than the predetermined threshold value (step 703: Yes), the processor 160 of the UE 100-2 performs a process of step 705. Meanwhile, when the received level is equal to or more than the predetermined threshold value (step 703: No), the processor 160 of the UE 100-2 performs a process of step 706.

In step 704, the processor 160 of the UE 100-2 controls the radio transceiver 110 to transmit a Discovery response signal to the UE 100-1.

In addition, the Discovery response signal may include information indicating that the UE 100-2 performs no D2D communication with the UE 100-1.

In step 705, the processor 160 of the UE 100-2 performs the assignment (scheduling) of a radio resource to be used in the D2D communication. Specifically, the processor 160 of the UE 100-2 autonomously selects a radio resource to be used in the D2D communication between the UE 100-1 and the UE 100-2 from radio resources available in the D2D communication. The processor 160 of the UE 100-2 performs a process of step 705 and then performs a process of step 709.

In step 706, the processor 160 of the UE 100-2 controls the radio transceiver 110 to transmit a Discovery response signal to the UE 100-1.

In addition, the Discovery response signal may include information indicating that the UE 100-2 performs the D2D communication with the UE 100-1.

In step 707, the processor 160 of the UE 100-2 controls the radio transceiver 110 to transmit a Discovery reception notification signal indicating the reception of the Discovery signal to the eNB 200. Furthermore, instead of the Discovery reception notification signal, the UE 100-2 may control the radio transceiver 110 to transmit a D2D request signal for requesting the start of the D2D communication to the eNB 200.

In step 708, the radio transceiver 110 of the UE 100-2 receives scheduling information from the eNB 200. Furthermore, the scheduling information in the present embodiment is information (that is, the first scheduling information of the first embodiment) indicating a radio resource assigned to the D2D communication between the UE 100-1 and the UE 100-2.

In step 709, the processor 160 of the UE 100-2 performs exchange (negotiation) of information to be used for establishing a D2D link with the UE 100-1, thereby establishing the D2D link. Specifically, when the received level is smaller than the predetermined threshold value (step 703: Yes), the processor 160 of the UE 100-2 establishes a D2D link corresponding to a radio resource assigned by the processor 160 of the UE 100-2. Meanwhile, the processor 160 of the UE 100-2 does not establish a connection with the eNB 200.

On the other hand, when the received level is equal to or more than the predetermined threshold value (step 703: No), the processor 160 of the UE 100-2 establishes a D2D link corresponding to a radio resource assigned by using the scheduling information received in the radio transceiver 110 from the eNB 200.

In step 710, the processor 160 of the UE 100-2 controls the radio transceiver 110 to transmit and receive data to and from the UE 100-1 through the D2D communication.

(4B) Operation of eNB 200

According to the operation of the eNB 200, in step 401 in the first embodiment, the radio transceiver 210 of the eNB 200 receives the relay notification signal from the UE 100-2. However, the second embodiment is different from the first embodiment in that the radio transceiver 210 of the eNB 200 receives the Discovery reception notification signal or the D2D request signal.

The processor 240 of the eNB 200 transmits scheduling information when the Discovery reception notification signal or the D2D request signal was received. As described above, the scheduling information in the present embodiment is the first scheduling information in the first embodiment.

Other operations of the eNB 200 are the same as those of the first embodiment.

(Summary of Second Embodiment)

When the start of the D2D communication with the UE 100-2 was accepted as the start of communication, the UE 100-1 according to the present embodiment transmits the Discovery signal including identification information for identifying the UE 100-2. In this way, the UE 100-2 is able to determine whether a Discovery signal addressed to the UE 100-2 was received. When it is the Discovery signal addressed to the UE 100-2, the UE 100-1 and the UE 100-2 start the D2D communication, so that it is possible to effectively utilize the D2D communication.

In the present embodiment, when the UE 100-2 received the Discovery signal including the identification information and the UE 100-2 is able to establish a connection with the eNB 200, the UE 100-2 transmits the reception notification signal indicating the reception of the Discovery signal to the eNB 200. In this way, the eNB 200 is able to recognize that the UE 100-2 performs the D2D communication with the UE 100-1.

In the present embodiment, when the UE 100-2 received the Discovery signal including the identification information and the UE 100-2 has difficulty to establish a connection with the eNB 200, the UE 100-2 assigns a radio resource that is used in the D2D communication between the UE 100-1 and the UE 100-2. Furthermore, when both the UE 100-1 and the UE 100-2 have difficulty to establish a connection with the eNB 200 (for example, both the UE 100-1 and the UE 100-2 exist out of coverage as illustrated in FIG. 6B), the influence of interference from the D2D communication to the cellular communication is small. In this case, even though it is not able to accept the assignment of a radio resource from the eNB 200, the UE 100-1 or the UE 100-2 autonomously performs the assignment of a radio resource at the initiative of the terminal, thereby starting the D2D communication.

[Other Embodiments]

Thus, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, in the aforementioned embodiments, a user of the UE 100-1 directly operates the UE 100-1, so that the UE 100-1 accepts the start of communication. However, the present invention is not limited thereto. It is sufficient if a signal indicating the start of communication is input to the processor 160 of the UE 100-1, and for example, the UE 100-1 connected to PC may instruct to start communication to the processor 160 of the UE 100-1 from an application.

Furthermore, in the aforementioned embodiments, the UE 100-1 is located out of the cell 250 managed by the eNB 200. However, the UE 100-1 may be located in the cell 250 managed by the eNB 200 if the received level of the reference signal received from the eNB 200 is smaller than the predetermined threshold value. Consequently, for example, even though the state of the UE 100-1 is in coverage, when the UE 100-1 has difficulty to establish a connection with the eNB 200, the UE 100-1 may transmit the Discovery signal as described in the aforementioned embodiments.

Furthermore, in the aforementioned embodiments, there is one eNB 200. However, if there are a plurality of eNBs 200, when the UE 100-1 accepted the start of communication and the UE 100-1 has difficulty to establish a connection with each of the eNBs 200, the UE 100-1 transmits the Discovery signal.

Furthermore, the UE 100-1 may periodically transmit the Discovery signal, and a transmission frequency of the Discovery signal and a transmission interval thereof may be appropriately changed in response to the Discovery response signal.

Furthermore, in the aforementioned embodiments, the UE 100-2 transmits the Discovery response signal. However, the transmission of the Discovery response signal may be omitted. Specifically, in step 111 of the first embodiment, the UE 100-2 may not transmit the Discovery response signal. That is, in step 304 of the first embodiment, the processor 160 of the UE 100-2 may control the radio transceiver 110 not to transmit the Discovery response signal. In addition, in step 704 of the second embodiment, the processor 160 of the UE 100-2 may control the radio transceiver 110 not to transmit the Discovery response signal.

Furthermore, in the second embodiment, when the UE 100-2 received the Discovery signal including the identification information and the UE 100-2 has difficulty to establish a connection with the eNB 200, the UE 100-2 assigns a radio resource to be used in the D2D communication between the UE 100-1 and the UE 100-2. However, the UE 100-1 may assign the radio resource to be used in the D2D communication between the UE 100-1 and the UE 100-2.

Furthermore, the first embodiment and the second embodiment may be performed through a combination thereof. For example, the UE 100-1 may transmit the Discovery signal including the communication demand information or the relay request information, and the identification information for identifying a specific terminal. The UE 100-2 that received the Discovery signal may perform the operation of the second embodiment when the Discovery signal includes identification information addressed to the UE 100-2, or may perform the operation of the first embodiment when the Discovery signal includes no identification information addressed to the UE 100-2.

Furthermore, in the second embodiment, the UE 100-2 received the Discovery signal including the identification information addressed to the UE 100-2. However, when a Discovery signal including identification information not addressed to the UE 100-2 was received, the UE 100-2 may perform the operation of the first embodiment. That is, a Discovery signal including identification information addressed to another terminal, other than the communication demand information and the relay request information, was received, the UE 100-2 may transmit the relay notification signal to the eNB 200.

Furthermore, in the aforementioned embodiments, the UE 100-1 exists out of coverage. However, even though the UE 100-1 exists in coverage, if the received level of the reference signal received in the UE 100-1 from the eNB 200 is smaller than the predetermined threshold value, when the start of communication was accepted, the UE 100-1 may transmit the Discovery signal.

Furthermore, in the aforementioned embodiments, the Discover response information includes connection enable information; however, this is not limiting. For example, the Discovery response signal may include relay enable information indicating that it is possible to relay the communication between the UE 100 existing out of coverage and the eNB 200. That is, the UE 100-2 may transmit the relay enable information to the UE 100-1 when the UE 100-2 exists in coverage and receives the Discovery signal from the UE 100-1 existing out of coverage.

It is noted that the UE 100-1 and the UE 100-2 determines that the each of the UE 100-1 and the UE 100-2 exists out of coverage when it is not possible to receive the signal from the eNB 200 (or when the reception level of the signal received from the eNB 200 is less than a predetermined threshold value), and determines that each of the UE 100-1 and the UE 100-2 exists in coverage when it is possible to receive the signal from the eNB 200 (or when the reception level of the signal received from the eNB 200 is equal to or more than a predetermined threshold value).

Further, in the aforementioned embodiments, the Discovery signal transmitted by the UE 100-1 existing out of coverage may be a specific Discovery signal by which it is possible to recognize that the UE 100-1 exists out of coverage. For example, the specific Discovery signal may be a discovery signal including out-of-coverage information indicating that the UE 100-1 exists out of coverage. Specifically, in the specific Discovery signal, a field (Out of coverage indication field) is arranged which stores an information element indicating that the UE 100-1 from which the specific Discovery signal is transmitted exists out of coverage. Alternatively, the specific Discovery signal may be a discovery signal indicating that the UE 100-1 exists out of coverage. That is, it may be possible to define a signal sequence (Out-of-coverage discovery signal format dedicated to UE) for a discovery signal exclusively used by the UE 100 existing out of coverage.

Furthermore, in the aforementioned embodiments, the UE 100-1 transmits the Discovery signal and the UE 100-2 receives the discovery signal from the UE 100-1; however, this is not limiting. For example, the UE 100-2 may periodically or non-periodically transmit a predetermined signal (for example, the Discovery signal) for the UE 100 existing out of coverage, irrespective of the transmission of the Discovery signal from the UE 100-1.

Specifically, the UE 100-2 may transmit the relay enable information indicating that it is possible to relay the communication between the UE 100 existing out of coverage and the eNB 200. The UE 100-2 may transmit the discovery signal including the relay enable information, and may transmit a specific discovery signal indicting the relay enable information.

The UE 100-2 may transmit the relay enable information on the basis of an instruction from the eNB 200. For example, if it is determined that the UE 100-2 exists at an end unit of its own cell when there is no neighboring cell neighboring its own cell managed by the eNB 200 or when there is a distance from its own cell to the neighboring cell, then the eNB 200 may transmit to the UE 100-2 an instruction for transmitting the relay enable information. The instruction may request to transmit the relay enable information. The UE 100-2 transmits the relay enable information in accordance with the instruction upon reception of the instruction from the eNB 200. This instruction may include radio resource information and/or timing information for transmitting the relay enable information. It is noted that the eNB 200 determines on the basis of the reception level of the signal from the UE 100-2 whether the UE 100-2 exists at the end unit of its own cell, for example. The eNB 200 determines that the UE 100-2 exists at the end unit of its own cell when the reception level of the signal from the UE 100-2 connected to its own cell is less than a predetermined threshold value. Further, the eNB 200 may determine on the basis of location information of the UE 100-2 whether the UE 100-2 exists at the end unit of its own cell.

Alternatively, the UE 100-2 may transmit the relay enable information when it is determined that the UE 100-2 exists at the end unit of a cell managed by the eNB 200. It is noted that the UE 100-2 determines that the UE 100-2 exists at the cell end unit when the reception level of the signal from the cell with which the UE 100-2 establishes a connection is equal to or more than a first threshold value indicating that it is difficult to establish a connection with the cell and less than a second threshold value indicating that the UE 100-2 exists closer to the center of the cell, for example. The UE 100-2 may transmit the relay enable information upon determination that the UE 100-2 exists at the cell end unit when the reception level of the signal from all the other cells different from the above-described cell is less than a third threshold value indicating that it is difficult to establish a connection with all the other cells, in addition to the above-described determination based on the reception level of the signal from the cell with which the UE 100-2 establishes a connection.

The UE 100-1 existing out of coverage periodically or non-periodically scans the discovery signal and receives the discovery signal from the UE 100-2. The UE 100-1 may transmit the discovery signal (or a response to the discovery signal) on the basis of reception of the discovery signal from the UE 100-2.

It is noted that the UE 100-2 may transmit the synchronization signal used for the D2D communication, for the UE 100-1 existing out of coverage. For example, the UE 100-2 may transmit the above-described discovery signal as a synchronization signal including synchronization information used by the UE 100-1 existing out of coverage for synchronization, or may transmit another synchronization signal different from the discovery signal. It is noted that when the UE 100-1 receives the synchronization signal, the UE 100-1 performs synchronization for the D2D communication on the basis of the synchronization signal. The UE 100-1 may transmit the discovery signal in response to reception of the synchronization signal. It is noted that when it is known that the UE 100-1 exists out of coverage, the UE 100-2 may transmit the synchronization signal, or may transmit the synchronization signal also when it is not known that the UE 100-1 exists out of coverage.

It is noted that even when the UE 100-1 receives the discovery signal from the UE 100-2, if the UE 100-1 receives a discovery signal intended only for discovery (that is, a discovery signal not intended for communication), then the UE 100-1 may not transmit the discovery signal even in a case where a partner terminal (that is, the UE 100-2) is already discovered. Further, the UE 100-1 and the UE 100-2 may end the establishment of the D2D link when conditions do not match each other, for example, at a stage where the information used for establishing the D2D link is exchanged.

It is noted that in the above-described embodiments, as the discovery signal, the Discovery signal is used as an example; however, this is not limiting. The discovery signal may be a Discoverable signal allowing for discovery by the adjacent UE 100.

Further, in the aforementioned embodiments, one example of the present invention is applied to the LTE system is described; however, the present invention is not limited to the LTE system, and the present invention may be applied to a system other than the LTE system.

In addition, the entire content of U.S. Provisional Application No. 61/706,365 (filed on Sep. 27, 2012) is incorporated in the present specification by reference.

INDUSTRIAL APPLICABILITY

As described above, the mobile communication system, a user terminal, a processor and a base station according to the present invention are able to appropriately control D2D communication, and thus are useful for a mobile communication field.

The invention claimed is:

1. A mobile communication system that supports device to device (D2D) communication, comprising:
  a first user terminal
  a second user terminal; and
  a base station, wherein
  the first user terminal transmits a first D2D discovery signal indicating that the first user terminal requests relay of communication between the first user terminal and the base station,
  the second user terminal receives the first D2D discovery signal,
  the second user terminal determines whether a received power of a reference signal from the base station is above a first threshold value and below a second threshold value,
  in response to the second user terminal determining that the received power is above the first threshold value and below the second threshold value, the second user terminal transmits indication information to the base station, wherein the indication information indicates that the second user terminal is capable of performing the relay of communication between the first user terminal and the base station, and
  the base station transmits, to the second user terminal, information of a radio resource for the relay.

2. The mobile communication system according to claim 1, wherein, the information of the radio resource includes scheduling information indicating a radio resource assigned to (D2D) communication between the first user terminal and the second user terminal.

3. The mobile communication system according to claim 1, wherein the information of the radio resource includes scheduling information indicating a radio resource assigned to communication between the second user terminal and the base station.

4. The mobile communication system according to claim 1, wherein
  the first user terminal determines whether a received power of a reference signal from the base station is below a third threshold value,
  in response to the first user terminal determining that the received power is below the third threshold value, the first user terminal transmits the first D2D discovery signal.

5. The mobile communication system according to claim 1, wherein
  the first D2D discovery signal further includes an identifier of a specific user terminal,
  the second user terminal further determines whether the second user terminal owns the identifier included in the received first D2D discovery signal, and
  the second user terminal further transmits, based on the determination, a second D2D discovery signal responding to the first D2D discovery signal.

6. A processor for controlling a second user terminal in a mobile communication system that supports device to device (D2D) communication, wherein
  the processor executes:
    a process of receiving, from a first user terminal, a first D2D discovery signal indicating that the first user terminal requests a relay of communication between the first user terminal and a base station;
    a process of determining whether a received power of a reference signal from the base station is above a first threshold value and below a second threshold value;
    a process of transmitting, in response to determination that the received power is above the first threshold value and below the second threshold value, indication information to the base station, wherein the indication information indicates that the second user terminal is capable of performing the relay of communication between the first user terminal and the base station; and
    a process of receiving, information of a radio resource for the relay, from the base station.

7. A second user terminal in a mobile communication system that supports device to device (D2D) communication, comprising:
  a receiver configured to receive, from a first user terminal, a first D2D discovery signal indicating that the first user terminal requests relay of communication between the first user terminal and a base station;
  a controller configured to determine whether a received power of a reference signal from the base station is above a first threshold value and below a second threshold value;
  a transmitter configured to transmit, in response to the controller determining that the received power is above the first threshold value and below the second threshold value, indication information to the base station, wherein the indication information indicates that the second user terminal is capable of performing the relay of communication between the first user terminal and the base station, wherein
  the receiver is further configured to receive recource information for the relay, from the base station.

8. The second user terminal according to claim 7, wherein
  the first D2D discovery signal further includes an identifier of a specific user terminal,
  the controller is further configured to determine whether the second user terminal owns the identifier included in the received first D2D discovery signal, and
  the transmitter is further configured to transmit, based on the determination, a second D2D discovery signal responding to the first D2D discovery signal.

9. A base station in a mobile communication system that supports device to device (D2D) communication, comprising:
  a receiver configured to receive indication information from a second user terminal, the indication information indicating that the second user terminal is capable of performing relay of communication between a first user terminal and the base station, and
  a transmitter configured to transmit, in response to the received indication information, to the second user terminal, resource information for the relay, wherein the resource information includes first scheduling information indicating a radio resource assigned to the D2D communication between the first user terminal and the second user terminal, and
a received power of a reference signal from the base station is above a first threshold value and below a second threshold value.

\* \* \* \* \*